United States Patent
Merino Rojo et al.

(10) Patent No.: US 7,252,734 B2
(45) Date of Patent: Aug. 7, 2007

(54) PROCESS FOR MANUFACTURING A HEADLINER FOR THE INTERIOR OF AN AUTOMOBILE AND INSTALLATION FOR USE IN THE PROCESS

(75) Inventors: Francisco Javier Merino Rojo, Burgos (ES); Francisco Javier De Pablo Yague, Burgos (ES)

(73) Assignee: Grupo Antolin-Ingenieria, S.A., Burgos (ES)

( * ) Notice: Subject to any disclaimer, the term of this patent is extended or adjusted under 35 U.S.C. 154(b) by 0 days.

(21) Appl. No.: 11/184,854

(22) Filed: Jul. 20, 2005

(65) Prior Publication Data

US 2006/0027315 A1    Feb. 9, 2006

(30) Foreign Application Priority Data

Aug. 4, 2004    (EP) .................................. 04380166

(51) Int. Cl.
*B29C 65/02*    (2006.01)
*B32B 38/10*    (2006.01)
*B32B 37/14*    (2006.01)
*B32B 37/18*    (2006.01)

(52) U.S. Cl. ..................... 156/267; 156/250; 156/268; 156/529; 156/236

(58) Field of Classification Search ................ 156/230, 156/529, 546, 550, 248, 250, 268
See application file for complete search history.

(56) References Cited

U.S. PATENT DOCUMENTS

| | | | | |
|---|---|---|---|---|
| 4,328,067 A | * | 5/1982 | Cesano ........................ | 156/511 |
| 4,504,347 A | * | 3/1985 | Munk et al. ................. | 156/245 |
| 4,986,865 A | * | 1/1991 | Fujii ........................... | 156/214 |
| 6,821,376 B1 | * | 11/2004 | Rayssac et al. .............. | 156/344 |

* cited by examiner

*Primary Examiner*—Melvin Mayes
*Assistant Examiner*—Sonya Mazumdar
(74) *Attorney, Agent, or Firm*—Birch, Stewart, Kolasch & Birch, LLP

(57) ABSTRACT

A process for manufacturing a headliner for the interior of an automobile comprise the steps of: introducing at least one layer intended for constituting a support and one lining layer (200) in a press (300); applying pressure and heat on the layers and thus obtaining an assembly of layers joined to one another; cutting the support (100) such that a surplus portion (102) of the support is separated from a main portion (101) of the support; applying a hot fluid on the lining layer in the area in which it is adhered to the surplus portion of the support; separating the surplus portion (102) of the support from the lining layer (200); and covering a trimmed edge (101*a*) with the lining layer (200).

4 Claims, 14 Drawing Sheets

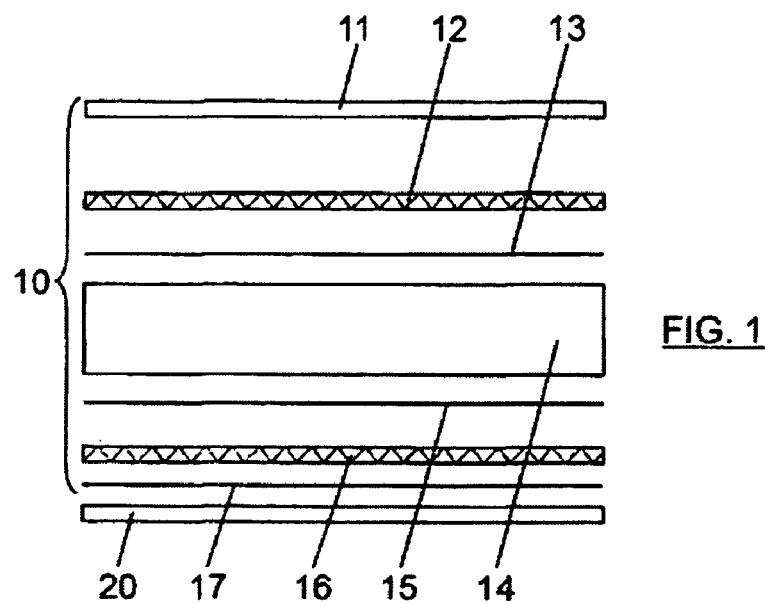
FIG. 1
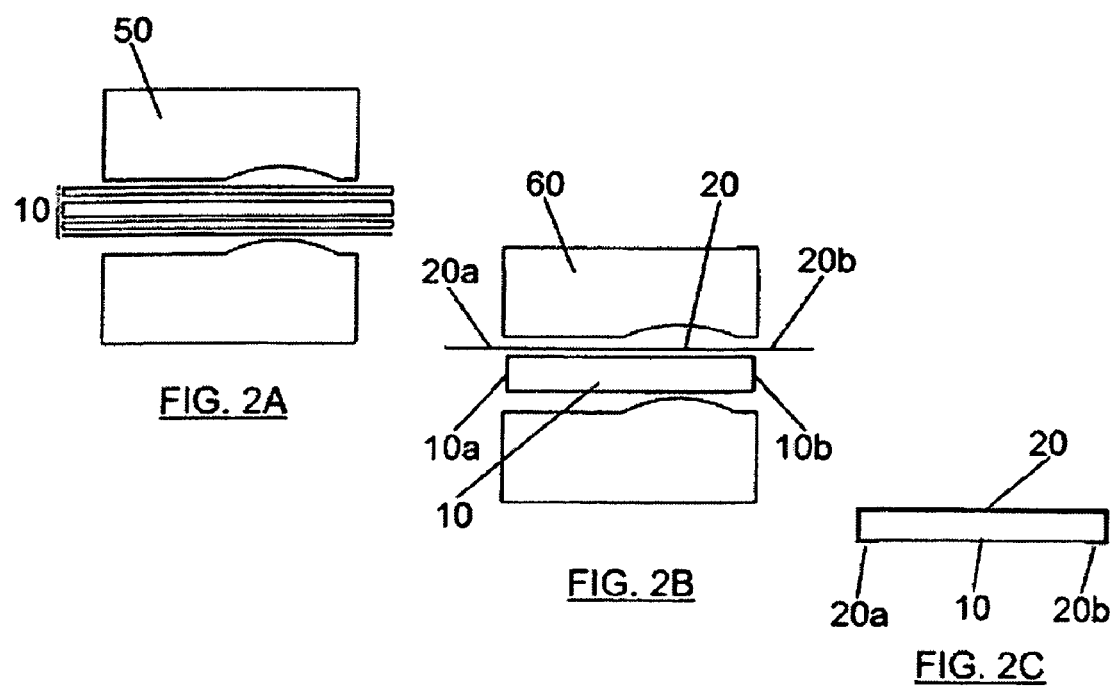
FIG. 2A
FIG. 2B
FIG. 2C

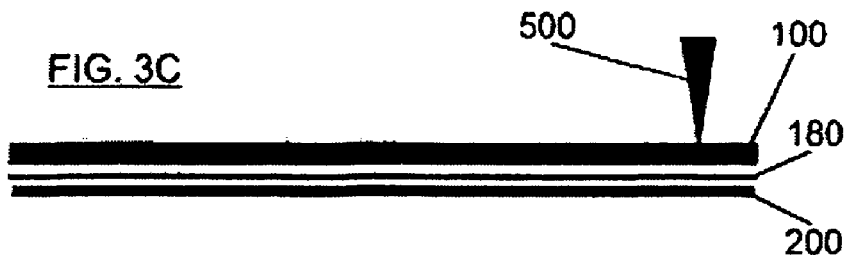
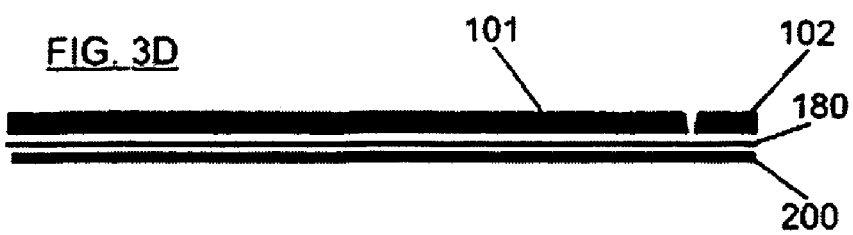
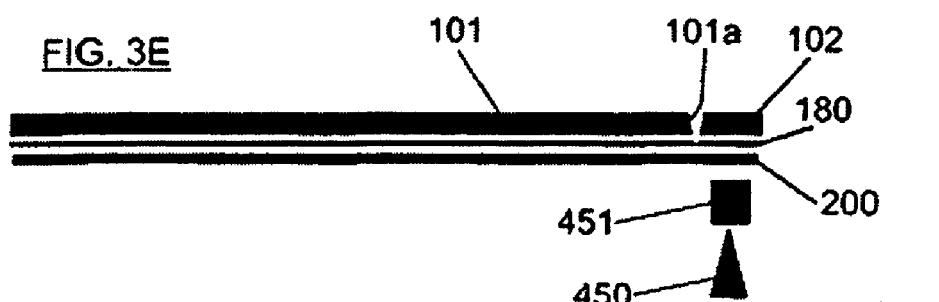
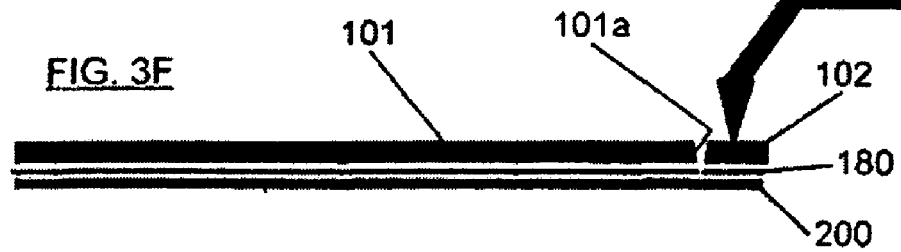
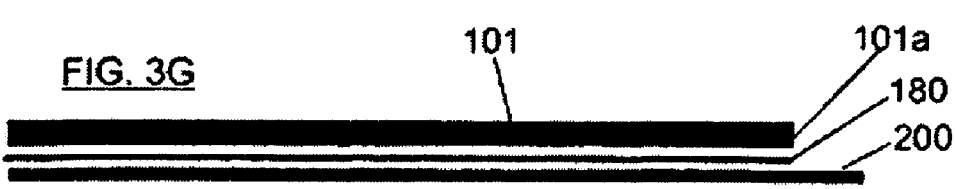
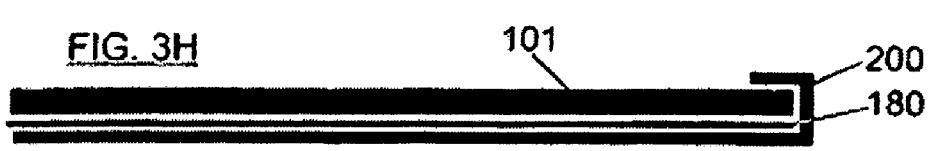

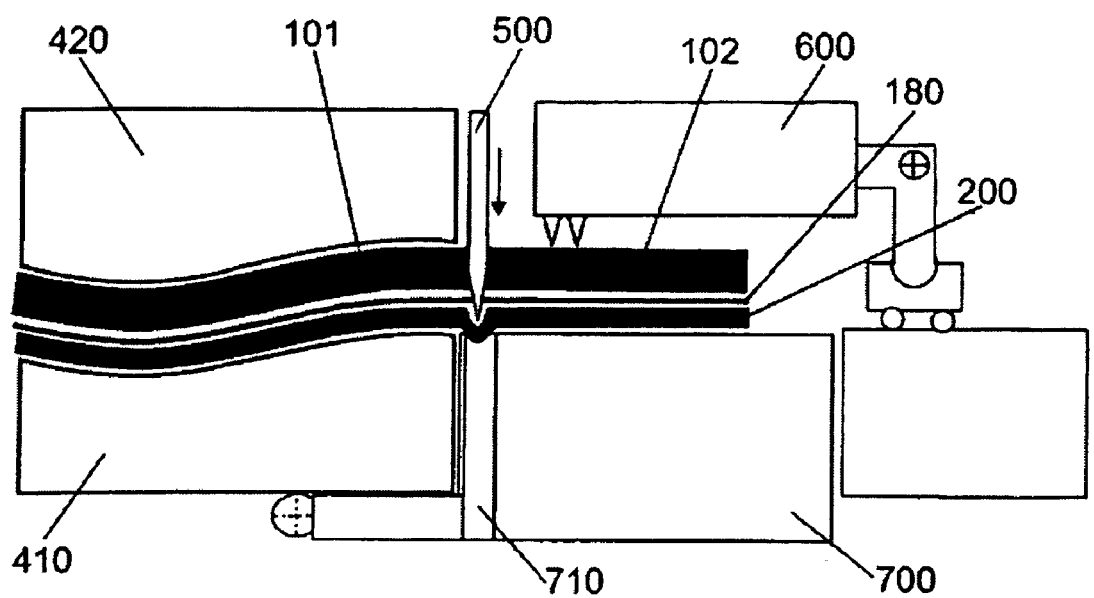
FIG. 4E
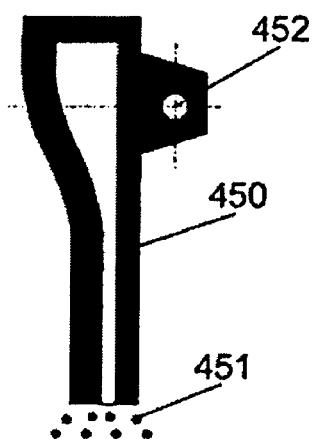

PROCESS FOR MANUFACTURING A HEADLINER FOR THE INTERIOR OF AN AUTOMOBILE AND INSTALLATION FOR USE IN THE PROCESS

BACKGROUND OF THE INVENTION

1. Field of the Invention

The invention relates to the obtainment of headliners for the interior of automobiles, specifically, edged headliners of the type having a lined side.

2. Description of the Related Art

Many processes of obtaining lined stratified products are currently known, and are constituted of:
- a stratified support (made up of several layers, together forming the support); and
- a lining applied on the visible side of the support, which lining also covers some or all of the edges of said support.

The support can also be obtained in a mold by means of applying heat and pressure on an assembly of layers or sheets, such that said layers are adhered to one another and adopt a configuration predetermined by the contact surfaces of the press. In the same press or in a subsequent phase, the support is trimmed, for example, to obtain the desired outline of the product and/or to arrange openings in the product. In a subsequent phase, a lining layer is applied on a visible surface or side (that corresponding to the portion seen by the user) of the support and on (at least some of) the trimmed edges of the support. The main reason for applying the lining in a phase subsequent to the support formation phase is that the lining must also cover the trimmed edges, or at least some of them; for that reason, the lining should not be trimmed together with the support.

An example of a process of this type is the process of obtaining a roof headliner for automotive vehicles. FIG. 1 schematically shows the different layers which can constitute a roof headliner for an automobile:

In the first place, there is a support 10 formed by the following layers:
- a non-fabric lining 11, for example, of paper, of the non-visible side of the product;
- a first reinforcement layer 12;
- a first thermosetting resin layer 13 serving to join the first reinforcement layer to a central layer 14;
- the central layer 14, which can be constituted of a polyurethane foam; said layer can have a semi-rigid consistency;
- a second thermosetting resin layer 15 intended for joining the central layer 14 to a second reinforcement layer 16;
- the second reinforcement layer 16; and
- a layer of light non-fabric material 17 (serving to prevent the support from sticking to the mold in the support pressing phase).

In the second place, joined to the layer of light non-fabric material 17, there is a lining 20 of the visible surface or side of the product (i.e., it is a lining seen by the end user) and which is normally joined to the support 10 by means of an adhesive (not shown in the figure). Many times, said lining must cover not only the main side of the support, but also different edges of the support, arranged by means of a support trimming process, this for the purpose of obtaining an end product with a better finish.

Currently, according to a standard method, the obtainment of roof headliners with edging of the lining (i.e., with the application of the lining on the edges of the support) is carried out in at least two separate pressing phases, by means of the use of two presses: one for obtaining the support and another one for applying the lining.

In the first phase, corresponding to obtaining the support, the different sheets or layers which will constitute the support are introduced in a press, one on top of the other. Then, pressure and heat are applied for the purpose of, on one hand, joining the layers (by means of polymerization of the thermosetting resins—13, 15—), and, on the other hand, giving the desired shape (curvatures, etc.) to the support. The support is also trimmed, i.e., portions of the material are eliminated for the purpose of establishing the desired outline of the support, through openings (for example, an opening corresponding to the sunroof window of the vehicle), etc. This trimming of the support can be carried out in the same press, as an integral part of the support obtainment phase, or separately, in a subsequent trimming phase carried out in another machine. As the result of the trimming and of the corresponding elimination of the portion of the laminar material, trimmed edges are formed, at least some of which must be lined with the same lining as the main visible side of the support.

In the second phase, an adhesive is applied (usually, an adhesive activated by means of pressure) on the layer of light non-fabric material of the support obtained as a result of the process described above. The support is placed in a second press, together with the visible side lining, and by means of applying pressure, the support is lined; the lining is adhered to the support by means of the adhesive applied.

The dimensions of the visible side lining somewhat exceed (in the areas which will be edged) those of the support, such that in a subsequent operation, the edging can be carried out by folding the surplus portions of the visible side lining, encircling the support.

This process is schematically shown in FIGS. 2A–2C:

In FIG. 2A, it can be observed how several layers, which will constitute a support 10, are introduced in a first press 50. The support is formed by means of applying pressure and heat. Furthermore, in the first press 50, peripheral portions of the support are also eliminated, such that edges 10a, 10b, which can be observed in FIG. 2B, are formed. In said FIG. 2B, It can be observed how the support 10 obtained in the first press 50, and with its edges 10a and 10b trimmed, has been introduced in a second press 60, together with a lining layer 20, the ends 20a and 20b of which project with regard to the upper surface of the support. An adhesive (not shown) has previously been applied on the surface of the support 10 to which the lining 20 is to be adhered. In the second press, by applying pressure and heat, the lining 20 is adhered to the upper surface of the support, with the ends 20a and 20b of the lining free. The possibility also exists to carry out, in the second press, trimmings of the lining, for example, so that its ends or outline have the desired configuration and/or to eliminate the material corresponding to, for example, a sunroof window (in which case the trimmed portion of the lining must be less than the surface of the window, for the purpose of allowing for the edging of the visible edges of the support delimiting the window).

Then in a subsequent step, adhesive is applied on the edges 10a, 10b of the support (and/or on the free ends 20a, 20b of the lining), and said edges are covered with the surplus free ends 20a, 20b of the lining (the adhesive is usually applied on the surpluses of the lining). FIG. 2C schematically shows how the lining 20 covers the visible side of the support 10 and how the free ends 20a, 20b of the lining cover the trimmed edges of the support.

In theory, the process described requires the use of two different presses:

i) a first press for obtaining the support by means of applying pressure and heat to an assembly of layers constituting the support; optionally, the trimming of the support can also be carried out in this first press for the purpose of defining the outline of the support and possible openings (for example, for a sunroof window), with the edges which subsequently must be lined: alternatively, the support can be trimmed in a subsequent phase; and ii) a second press in which the lining is applied on the support; optionally, possible trimmings of the lining layer can also be carried out in this second press (for example, to form the opening corresponding to a sunroof window).

With this process, it is necessary to use two presses since, if the lining is joined to the support in the first press, in the same process in which pressure and heat are applied for joining the different layers constituting the support, then when "trimming" the support, the lining layer is also trimmed, whereby there are no surplus free ends of the lining which can serve to cover the edges formed upon trimming the support, i.e., there is no surplus portion of the lining which can be used for lining said edges.

Therefore, in the standard process described, it is necessary to use a first press for shaping the support, which is then trimmed, to then pass to a second press in which the lining is applied.

To reduce expenses, it would be desirable to be able to carry out the entire process in a single press.

On the other hand, the standard process, based on the use of two presses, entails a large number of operations and usually requires several operators, for example: one operator for applying the adhesive to areas localized as the deep-drawings for the handles, sunshades etc., members requiring a large amount of adhesive so that the lining is completely adhered; another operator for applying adhesive to the entire surface of the support which must be lined; another operator for introducing the lining in the second press; another operator for positioning the support in the second press; and another operator for withdrawing the formed headliner from the second press.

U.S. Pat. No. 4,986,865 discloses a substantially known system according to that described above.

A manner of enabling the obtainment of the stratified product in a single press could be by introducing, between the layers (11–17) which will constitute the support 10 and the portions of the lining layer 20 which will constitute the surplus free ends (20a, 20b), once the support is trimmed, sheets of a material—for example, Teflon®—preventing said portions of the lining layer 20 from adhering to the support. In this manner, once the assembly integrated by support 10 and lining 20 has been obtained, the free ends (20a, 20b) of the lining are not joined/adhered to the support; then the support can be cut, and then said free ends of the lining can be folded over the trimmed ends. However, this manner of proceeding, namely, the use of Teflon® sheets or the like for preventing adhesion between the support 10 and lining 20 in certain areas (those which must be cut for the subsequent edging of the trimmed edges) can be laborious (for example, since it requires the step of introducing the Teflon® sheets), and the Teflon® sheets (or the like) can leave marks in the lining (as a result of the assembly pressing process), something which can negatively affect the final appearance of the obtained product.

SUMMARY OF THE INVENTION

Therefore, it has been considered that it would be desirable to develop a process allowing for reducing the number of presses and allowing for applying the lining to the support in the same pressing phase in which the support is formed, allowing, nevertheless, that a subsequent support trimming phase can be carried out without eliminating all the corresponding portions of the lining and, preferably, without the process negatively affecting the appearance of the visible side of the lining.

A first aspect of the invention refers to a process for manufacturing a headliner for the interior of an automobile (for example, for the roof of the automobile) comprising a support, constituted of at least one layer, and a lining covering a visible surface of the support and at least one edge of the support. The process comprises the following consecutive steps:

a) at least one layer intended for constituting a support, and at least one lining layer intended for being the lining of the visible surface of the headliner, are introduced in a press;

b) pressure and heat are applied on the layers in the press for the purpose of obtaining an assembly of layers joined to one another and with a predetermined shape defined by a mold forming part of the press;

c) the support is cut (without cutting the lining layer, it is possible that said layer is partially affected by the cutting, but it must not be traversed by the cutting and it is preferable that no marks of the cutting remain on the visible surface of the lining layer), such that at least one surplus portion of the support, not intended to be part of the stratified product, is separated from a main portion of the support, intended to be part of the stratified product, said at least one surplus portion of the support being joined to the main portion of the support by the lining layer (since the surplus portion of the support is still adhered to the lining layer);

d) a hot fluid (for example, steam) is applied on the lining layer in an area corresponding to said at least one surplus portion of the support (i.e., on the portion(s) of said lining layer which are adhered to the surplus portion(s) of the support);

e) said at least one surplus portion of the support is separated from the lining layer (which is easy since the adhesion between the surplus portion of the support and the lining layer has already been weakened by means of applying the hot fluid in step d)), such that an assembly remains comprising the main portion of the support and the lining layer, a portion of the lining layer projecting with regard to the main portion of the support, in correspondence with at least one trimmed edge (resulting from the cutting carried out in the step c)) of the main portion of the support;

f) said at least one trimmed edge is covered with the lining layer (200).

Application of the hot fluid, for example, steam (for example, saturated steam: temperature 133–165° C.; pressure 3–7 bar), serves so that it is easy to detach or separate the surplus portion of the support which, after the cutting, is no longer directly joined to the main portion of the support, but only (or at least almost only) to the lining layer. The separation of the surplus portion of the support can thus be achieved without leaving marks, since a strong force on the lining layer does not have to be exerted, and nor is it necessary to resort to placing the special separation plates in the areas where the lining is to be detached from the support. Once the surplus portion of the support is eliminated, adhesive can be applied on the surplus portions of the lining and/or on the trimmed edges to be lined, and the lining is folded over said edges, the desired lining of said edges being obtained.

It is thus achieved that the product, including support and visible surface lining joined to the support, can be obtained in a single press, in a single forming step. This means that the number of presses necessary is reduced, as well as the number of working moments. For example, it is no longer necessary to apply, in a separate step subsequent to obtaining the support, an adhesive layer for joining the lining layer to the support. All the steps can be carried out by a single operator and with a single press. This also involves a reduction of the factory floor space which has to be dedicated to the process.

Furthermore, reductions in the amounts of material used can be achieved. For example, the invention allows for reducing the amount of adhesive necessary for joining the lining layer to the support, since the lining layer is joined to the support in the support formation phase, thereby subsequently, only the adhesive necessary for adhering the surplus portions of the lining layer on the edges has to be applied. Furthermore, the process of the invention allows for eliminating the layer of light non-fabric material which served in the known system for preventing the support from adhering to the mold, since in the process according to the invention, the lining layer itself can serve for this purpose.

In step a), the lining layer can be situated on an intermediate layer (for example, a thermoplastic film, for example of polyamide, polyethylene or polypropylene) chosen for facilitating the separation of the portion of the lining layer from the surplus portion of the support by means of applying a hot fluid (for example steam). The use of an intermediate barrier film can depend on the type of lining used. For example, if a 3-layer lining is used, it can be unnecessary to use a barrier layer because one of its layers could achieve the barrier effect.

Another aspect of the invention refers to a machine or installation for use in a process of the type described above, especially for the cutting phase for cutting the support and removal of the surplus portion(s) thereof. The machine or installation comprises:

holding means (for example a cradle+counter-cradle/ hold-down plate assembly, or instead of the counter-cradle, a vacuum installation securing the headliner in the areas to be edged) for holding a stratified object comprising a support, constituted of at least one layer, and a lining covering a visible surface of the support, the lining layer being adhered to the support;

cutting means (for example, ultrasonic) configured to cut the support (but not the lining layer; at least, the cut should not go through said lining layer and preferably should not leave visible marks on its visible surface; in practice, it is possible that the cut can leave marks on the internal surface of the lining layer, but it should not leave them on the visible surface) according to a determined cutting trajectory, such that at least one surplus portion of the support, not intended to be part of the stratified product, is separated from a main portion of the support, intended to be part of the stratified product, such that said at least one surplus portion of the support is joined to the main portion of the support by the lining layer (this is achieved with a suitable selection and configuration of the cutting means, optionally in combination with a channel allowing the lining layer to somewhat move backwards with regard to the cutting means while carrying out the cutting, for example, due to elastic deformation of the lining layer under pressure exerted by the cutting means);

application means for applying a hot fluid (for example, steam) on the lining layer in an area corresponding to said at least one surplus portion of the support (for example, on the lining layer in said area corresponding to the at least one surplus portion (102) of the support); and optionally, separation means for separating the surplus portion of the support from the lining layer (the separation can be carried out without great stresses, since the application of hot fluid has already weakened the adhesion between the surplus portion of the support and the lining layer).

This installation allows for carrying out the cutting of the support of a stratified object (which could have been obtained in a press forming part of the same machine/ installation or in an independent press) and separating the surplus portion of the support from the lining layer (to which said surplus portion was adhered and to which the main portion of the support continues to be adhered) in a simple manner, a product with edges (resulting from the cuts carried out) which can be lined with the surplus portions of the lining layer (i.e., with the portions of the lining layer from which the corresponding surplus portions of the support have been detached) being obtained.

The separation means for separating the surplus portion of the support from the lining layer, can comprise a separator member which can shift between a first position, in which it is in contact with the surplus portion of the support still adhered to the lining layer, and a second position withdrawn with regard to the first position, the installation being configured such that once that the cutting means have cut the support according to the determined cutting trajectory, and once the hot fluid has been applied on the lining layer, the shifting of the separator member from the first to the second position causes an at least partial detachment or separation of the surplus portion of the support with regard to the lining layer. Basically, the separator member can push or drag the surplus portion of the support with regard to the lining layer, such that the possible residual adhesion (that which remains after applying steam) is "broken". Depending on how the manufacturing process is to be implemented, the separator member itself can drag or push the surplus portion such that it is completely separated from the lining layer (for example, dragging the surplus portion until it falls into a recycling container or the like). That is to say, the installation can be configured such that once the cutting means have cut the support according to the determined cutting trajectory, and once the hot fluid has been applied on the lining layer, the shifting of the separator member from the first position to the second position causes a complete separation of the surplus portion of the support with regard to the lining layer.

Alternatively, the separator member can be configured to simply shift the surplus portion of the support enough, with regard to the lining layer, to break any residual adhesion between the surplus portion of the support and the lining layer (or at least to substantially reduce the adhesion), to then let the operator of the machine or installation withdraw the surplus portion with a minimum effort.

The separator member can be arranged such that it can pivot or swivel between a contact position and a non contact position with a surplus portion of the support; the separation member can thus be pivoted to its non contact position before shifting the separator member from the second to the first position, and then pivot it to its contact position in said first position, in which it comes into a tight enough contact with the surplus portion of the support so as to drag said portion when the separator member moves backwards from the first to the second position (maintaining the separator member in the contact position). The dragging effect can be achieved by suitably choosing the pressure with which the separator member acts on the surplus portion of the support and the dragging force with which said separator member pulls on the surplus portion of the support.

On the other hand, the installation can include a support member which can shift between a support position, in which it is in contact with the lining layer in an area corresponding to the surplus portion of the support, and a withdrawn position in which it is not in contact with the lining layer in said area corresponding to the surplus portion of the support.

This support member can be configured to be in the support position when the separator member shifts from the first position to the second position, causing the at least partial detachment or separation of the surplus portion of the support with regard to the lining layer. In this case, the support member serves to prevent the lining layer from bending downwards, hindering the detachment/separation action exercised by the separator member.

On the other hand, the support member can be configured to be in the withdrawn position during an application phase for applying a hot fluid on the lining layer in correspondence with said at least one surplus portion of the support to allow the application means for applying hot fluid to have access to an area corresponding to the lining layer of the stratified object.

In order to achieve this, the support member can be configured in a pivoting or swiveling manner between the support position and the withdrawn position.

The installation can be configured such that, in a cutting phase for cutting the support with the cutting means, it includes a channel or open space corresponding to the cutting trajectory and located in correspondence with the lining layer, such that during said cutting phase the lining layer can enter (at least slightly) in said channel under pressure exerted by the cutting means. The "channel" or equivalent thus allows that, when the cut is carried out, the lining layer itself can, in the cutting area and under the influence of the pressure exerted by the cutting means, "move backwards" with regard to the cutting means, whereby the risk that the cutting means substantially affect the lining layer can be reduced. That is to say, the open "channel" allows for reducing the risk that a cut—or visible marks—occurs on the visible surface of the lining layer.

This channel can be established, at least partially, with the support member, for example, by means of a recess or depression in the support member and which follows the cutting trajectory, or by means of an edge of the support member such that the channel is established between said edge and another member of the machine/installation, for example, between said edge and an edge of the holding means.

A separation space between the separator member and a portion of the holding means for holding the stratified object—configured to rest on the support, for example, a "hold-down plate"—is defined in correspondence with the trajectory of the cut provided, such that the cutting means have assess to the support in said separation space according to said trajectory. The trajectory of the cut can be defined by means of programming a cutting robot.

The holding means for holding the stratified object can comprise at least one member configured to be in contact with the surface of the lining player and at least another member configured to be in contact with the support in an area adjacent to the cutting trajectory, to assure the position of the support in said area.

The application means for applying a hot fluid can comprise a fluid expulsion member (which can have an expulsion opening with a shape at least approximately copying the geometry of the surplus portion of the support) arranged in a shifting manner (for example swiveling) between an expulsion position in which it can expel the hot fluid on the lining layer in an area corresponding to the surplus portion of the support, and a standstill position withdrawn from said expulsion position. The movement of the fluid expulsion member and the movement of the support member can thus be coordinated, such that the support member is withdrawn from its support position before the expulsion member passes to the expulsion position, and vice versa.

BRIEF DESCRIPTION OF THE DRAWINGS

A series of drawings helping to better understand the invention and specifically related to an embodiment of said invention, shown as an illustrative and non-limiting example thereof, is very briefly described below.

FIG. 1 schematically shows different layers forming part of a roof headliner for automotive vehicles (both in the state of the art and according to a possible embodiment of the invention).

FIGS. 2A–2C schematically show some steps of the process for producing a lined stratified product according to the state of the art.

FIGS. 3A–3H schematically show the process according to a preferred embodiment of the invention.

DETAILED DESCRIPTION OF THE INVENTION

Figure 3A:
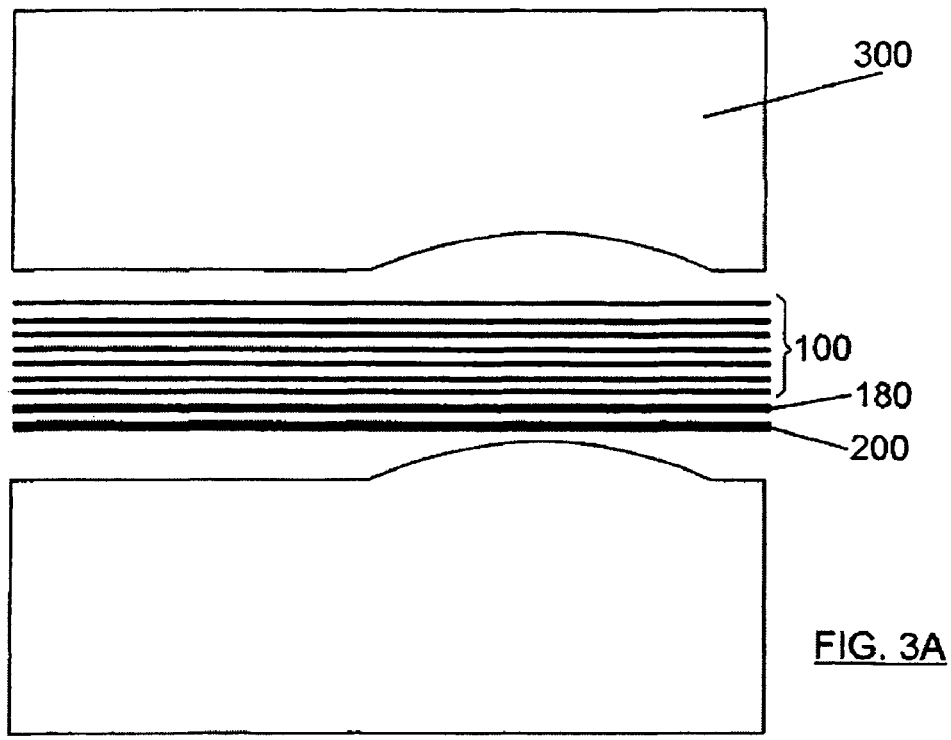

FIG. 3A schematically shows a first step of the manufacturing process according to an embodiment of the invention. In the first step, one or several layers intended for constituting a support 100 are introduced in a press 300, an intermediate layer 180 (for example, a polyamide, polyethylene or polypropylene thermoplastic film selected to facilitate the separation of a surplus portion of the support from the lining layer in a subsequent phase) and at least one lining layer 200 intended to be the lining of the visible surface of the product.

Figure 3B:
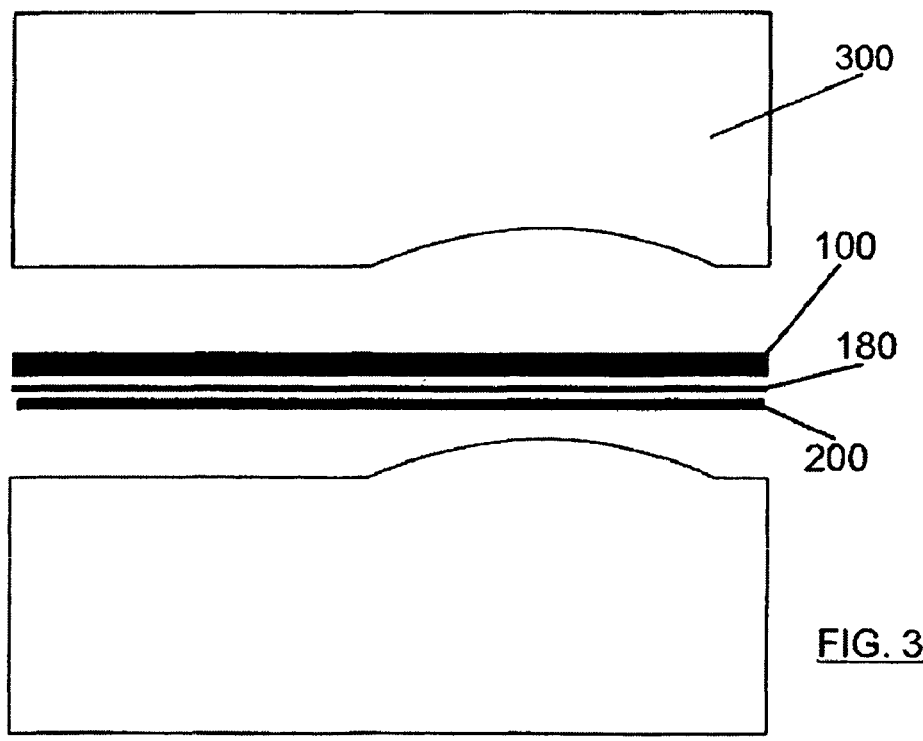

Then, heat and pressure are applied on the layers in the press for the purpose of obtaining an assembly of layers Joined to one another and with a predetermined shape defined by a mold forming part of the press; the obtained product is schematically shown in FIG. 3B.

Subsequently, as shown in FIG. 3C, the support 100 is cut using ultrasonic cutting means 500 (basically, a vibrating blade or sonotrode), but without cutting the lining layer 200 (at least not completely, and preferably without leaving marks on the visible side of said layer), such that a surplus portion 102 of the support, not intended to be part of the stratified product, is separated (see FIG. 3D) from a main portion 101 of the support, intended to be part of the stratified product. The surplus portion 102 of the support is thus joined to the main portion of the support by the lining layer 200 (and possibly by the intermediate layer 180 if the latter has not been cut by the cutting means 500); the main portion 101 of the support has a trimmed edge 101a (which is the one which must subsequently be covered with the lining layer).

In a following phase, schematically shown in FIG. 3E, a hot fluid, for example steam 451, expelled by a convector 450 or the like, is applied on the lining layer 200 in correspondence with the surplus portion 102 of the support to weaken the adhesion between said surplus portion 102 and the lining layer in the area affected by the hot fluid.

Subsequently, as shown in FIG. 3F, the surplus portion 102 of the support (and, if applicable, the portion of the intermediate layer 180 adhered to the surplus portion of the support) is dragged (for example, with a separator member 600 or with the hand of the operator) such that the surplus portion 102 of the support is separated from said lining layer (200). As can be seen in FIG. 3G, an assembly thus remains comprising the main portion of the support 101, a remaining portion of the intermediate layer 180, and the lining layer 200, a portion of said lining layer (200) projecting with regard to the main portion 101 of the support, in correspondence with the trimmed edge 101a of the main portion 101 of the support. Finally, the trimmed edge 101a is covered, applying adhesive on the trimmed edge 101a and/or on the corresponding side of the projecting portion of the lining layer 200 (usually on the lining), and said portion of the lining layer 200 is folded over the edge 101a, as can be seen In FIG. 3H.

Figure 4A:
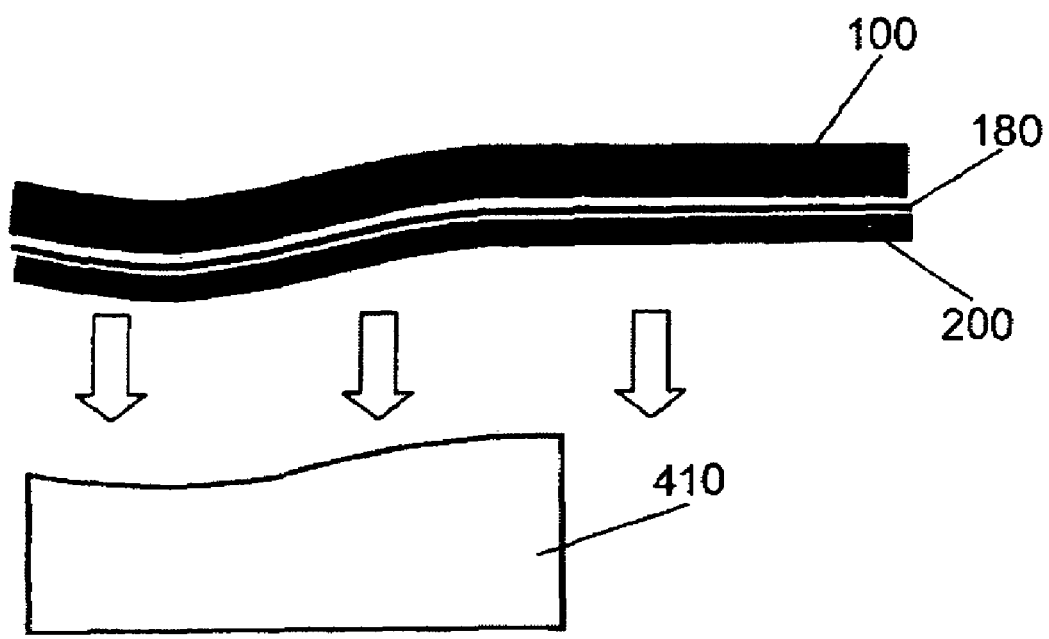
FIGS. 4A–4Q schematically show the relevant members of an installation according to a preferred embodiment of the invention, during a cutting and edging process according to the invention.
Figure 4B:
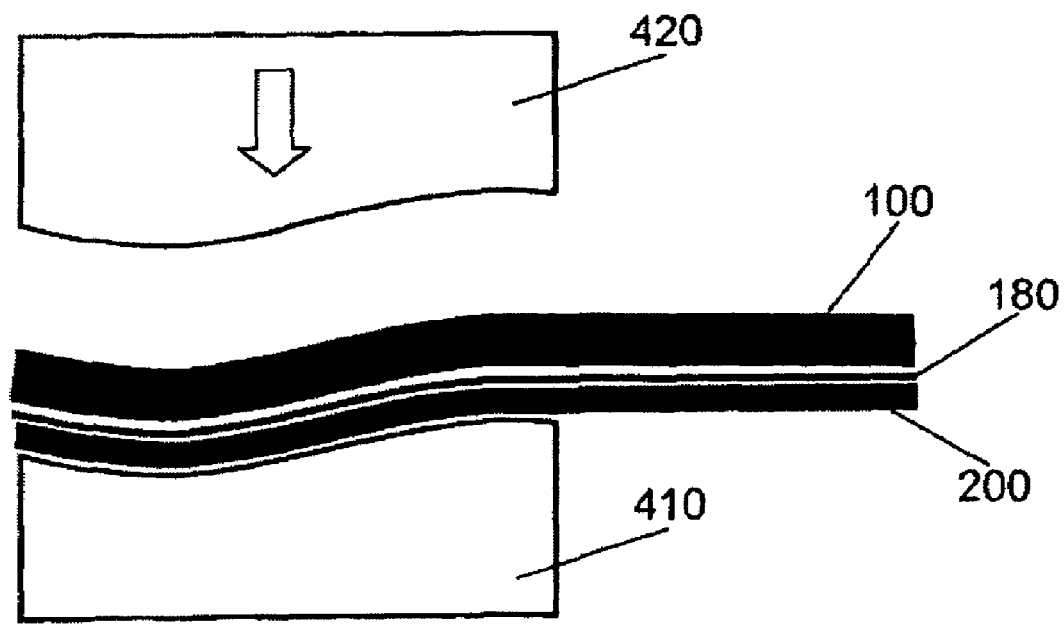
Figure 4C:
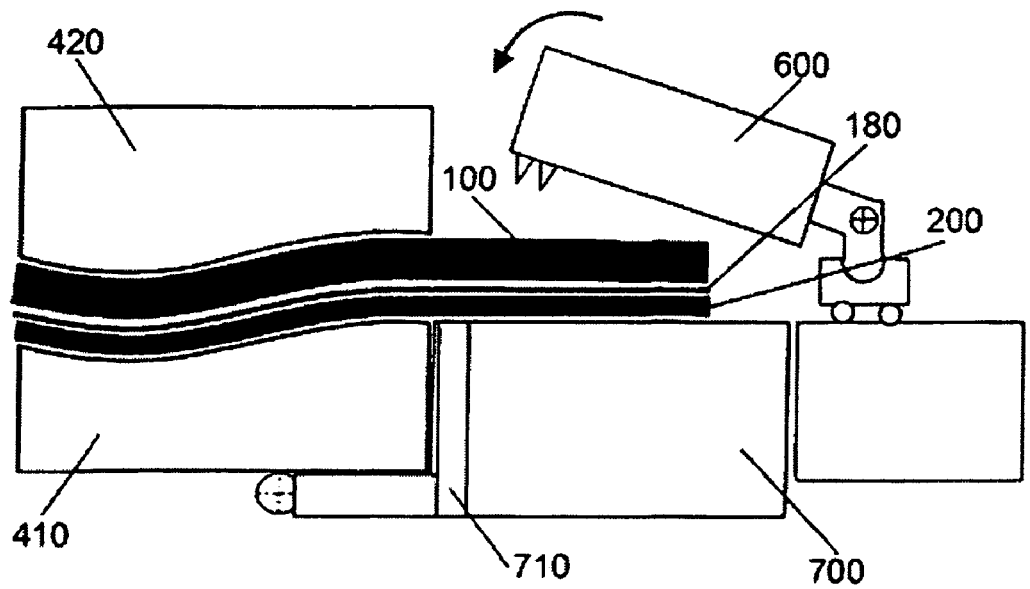
Figure 4D:
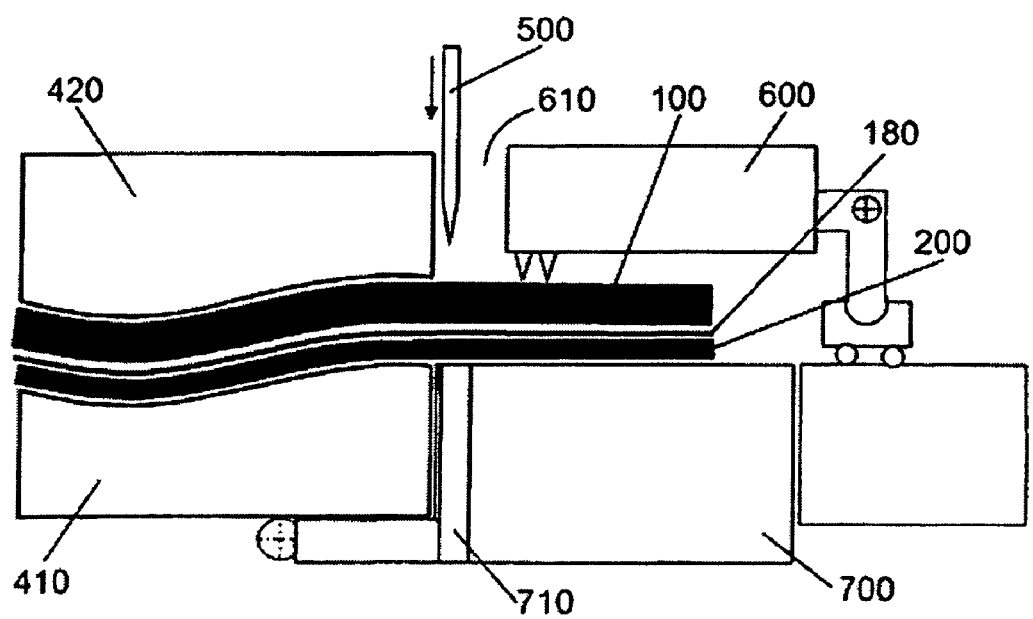
Figure 4F:
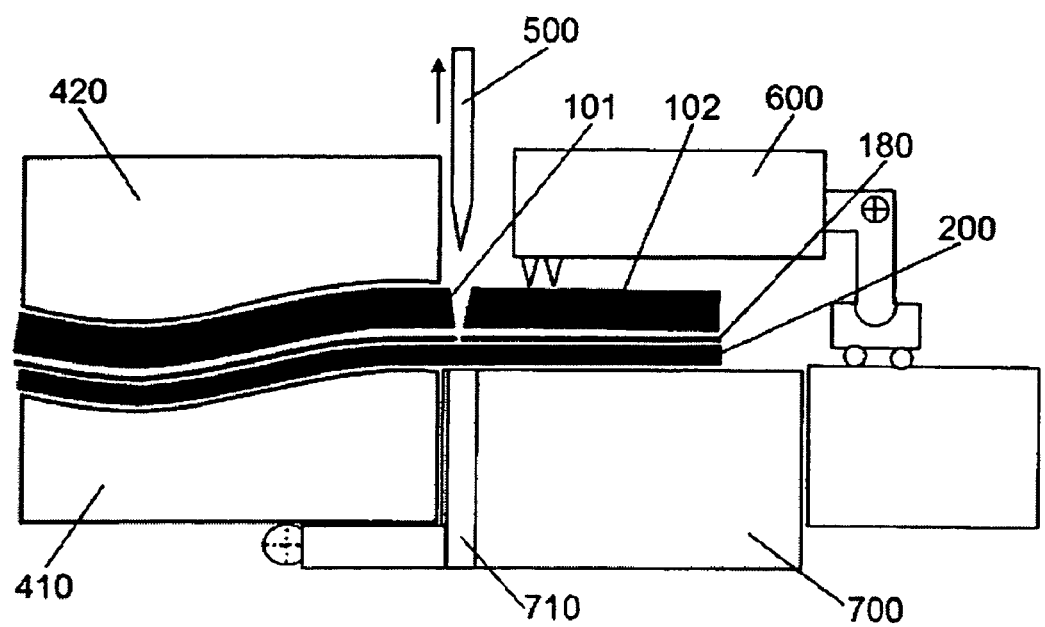
Figure 4G:
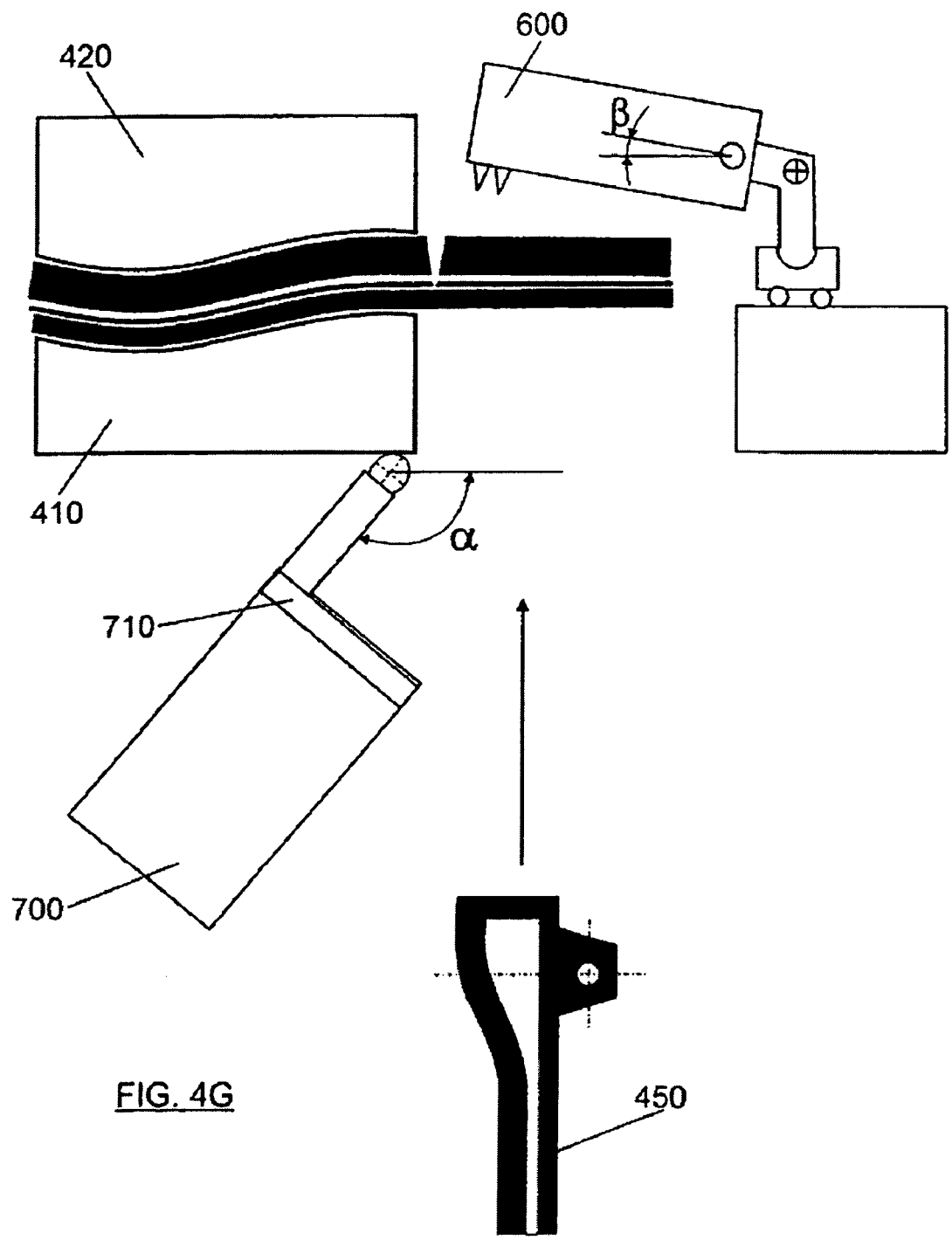
Figure 4H:
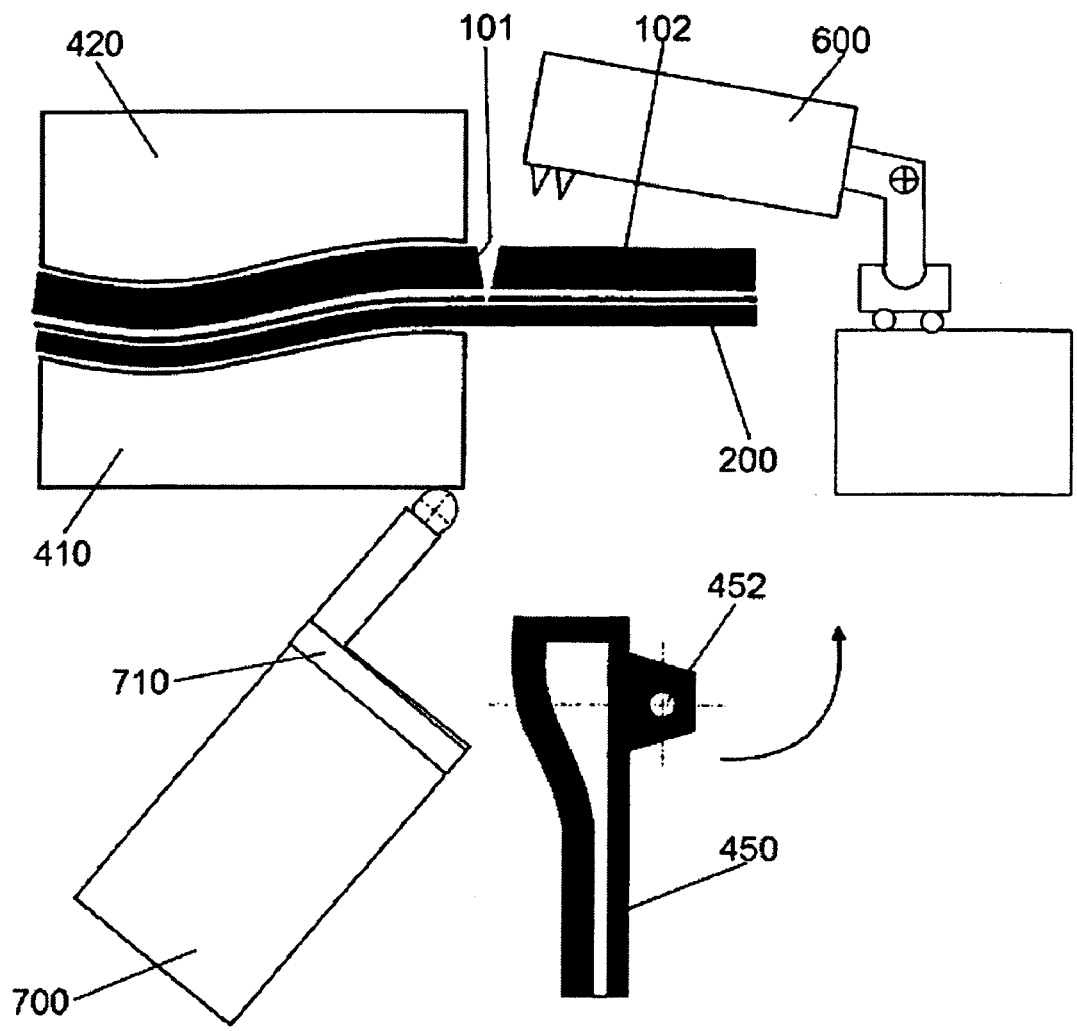
Figure 4I:
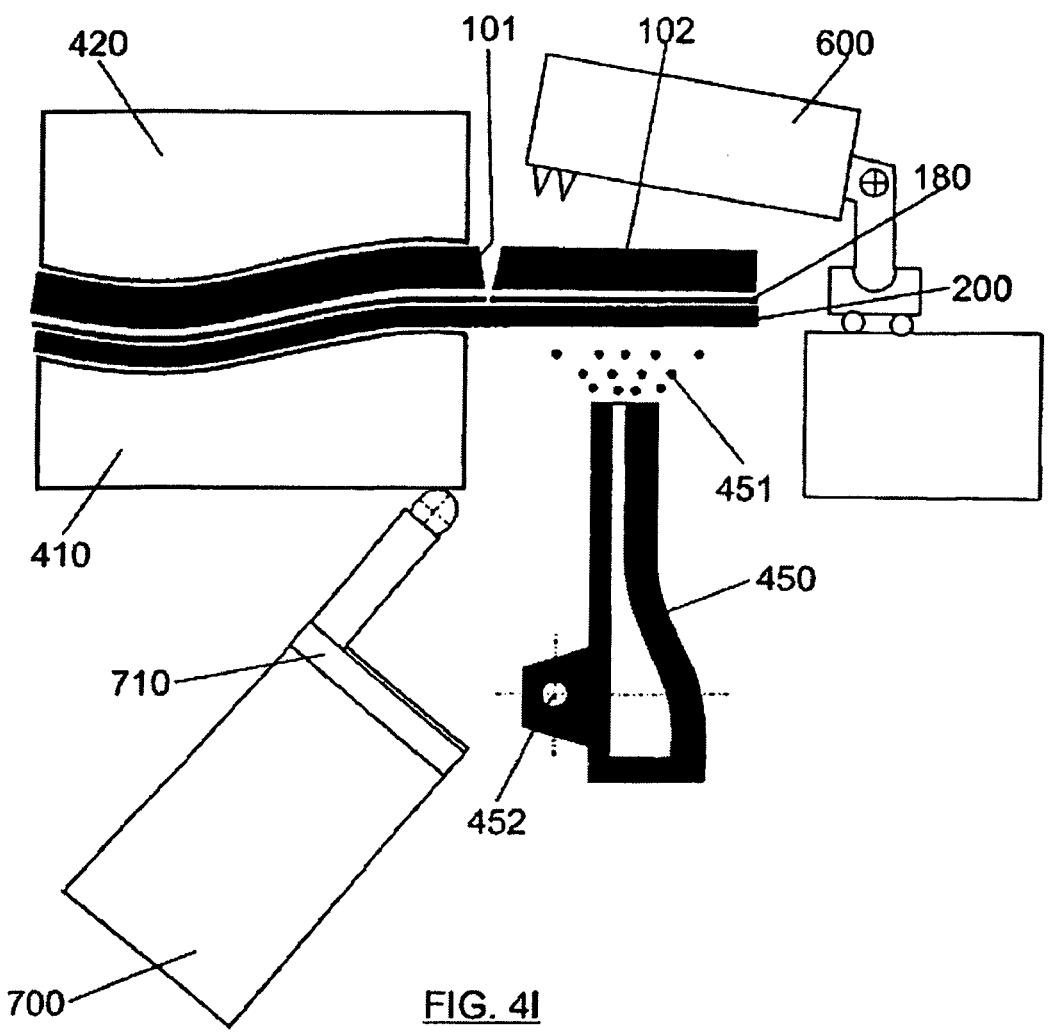
Figure 4J:
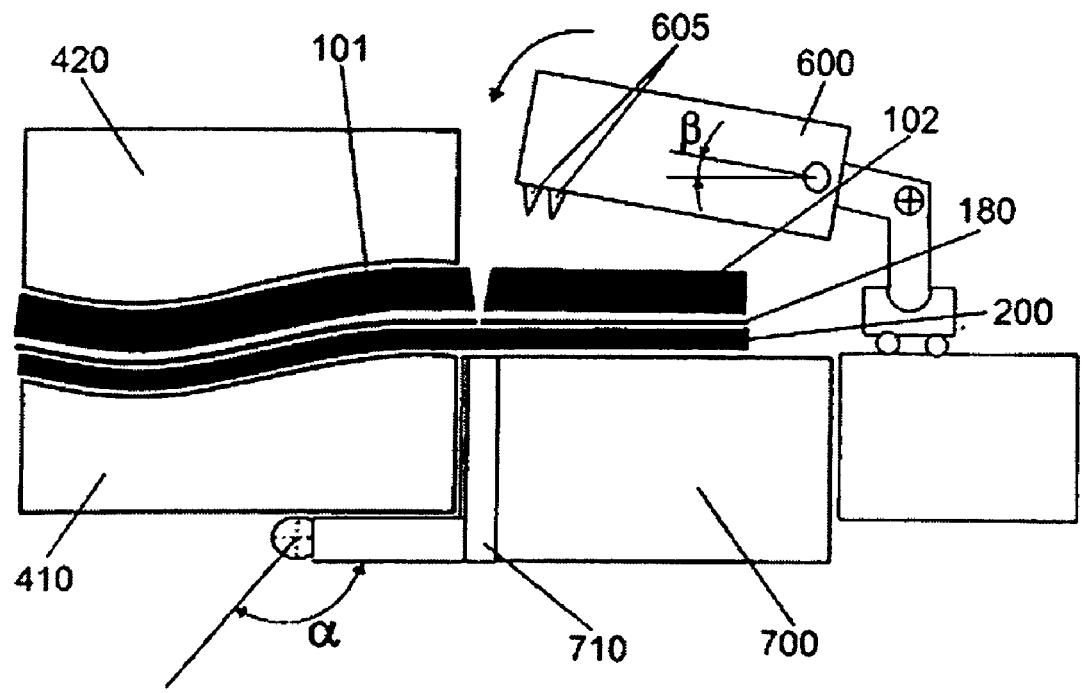
Figure 4K:
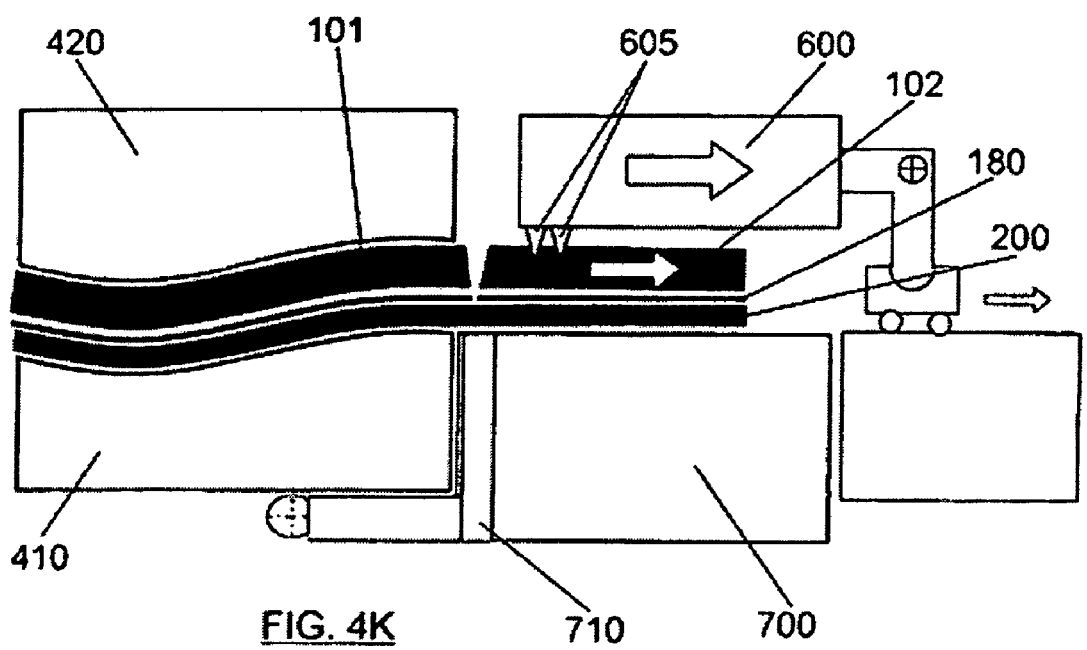
Figure 4L:
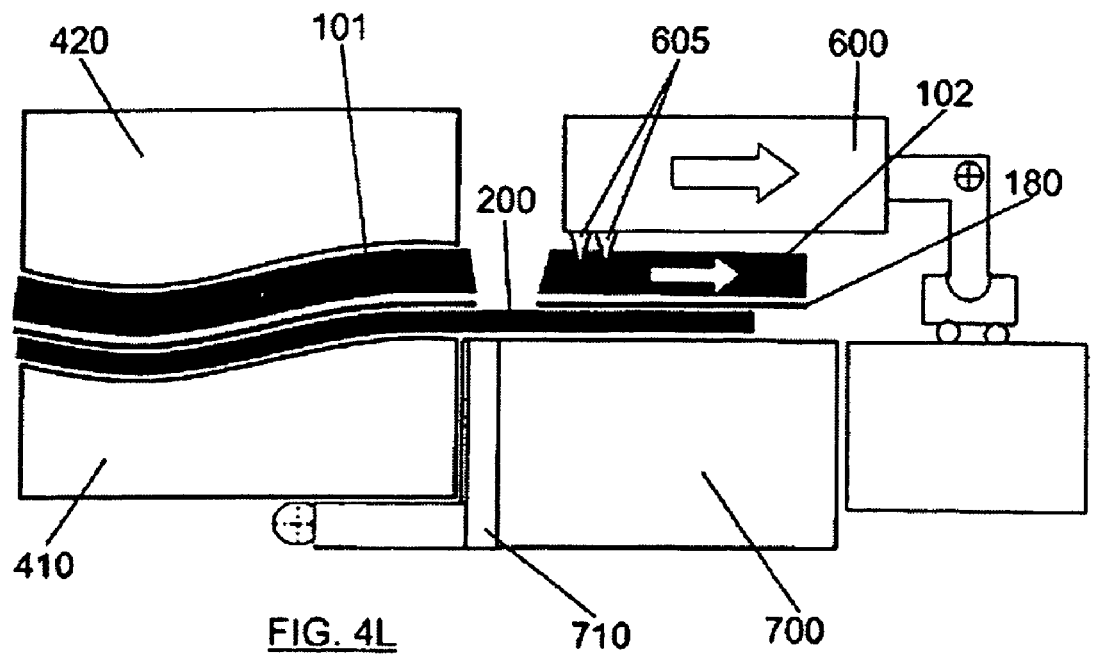
Figure 4M:
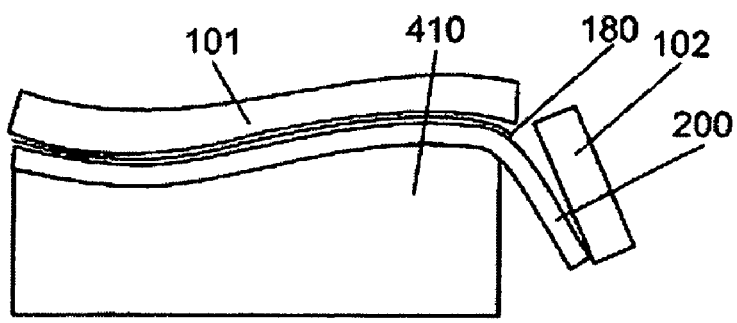
Figure 4N:
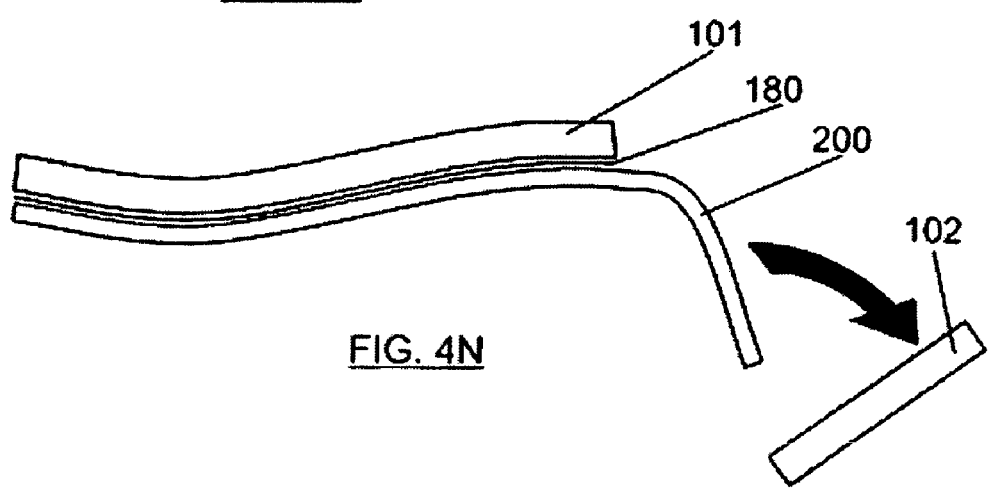
Figure 4O:
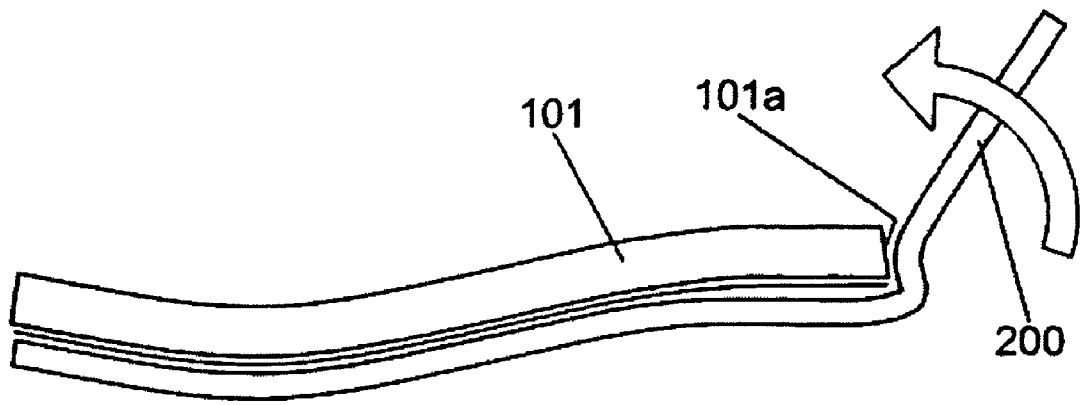
Figure 4P:
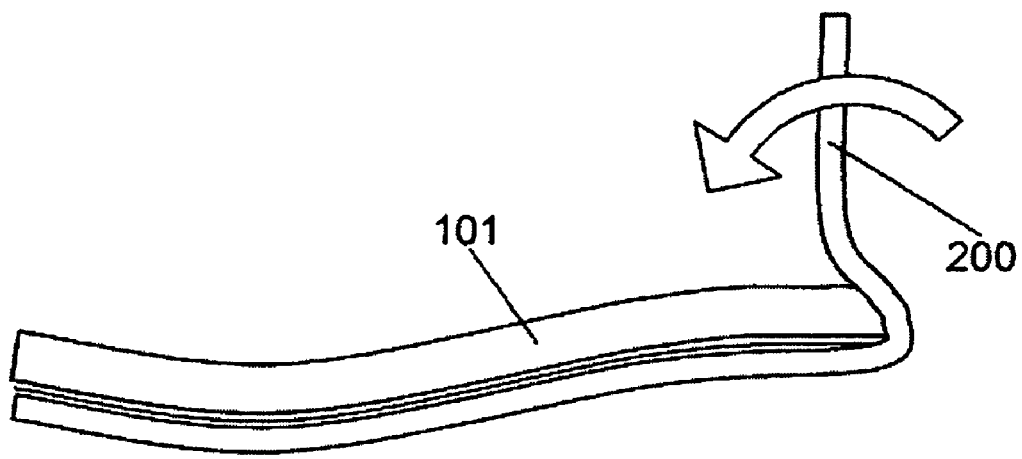
Figure 4Q:
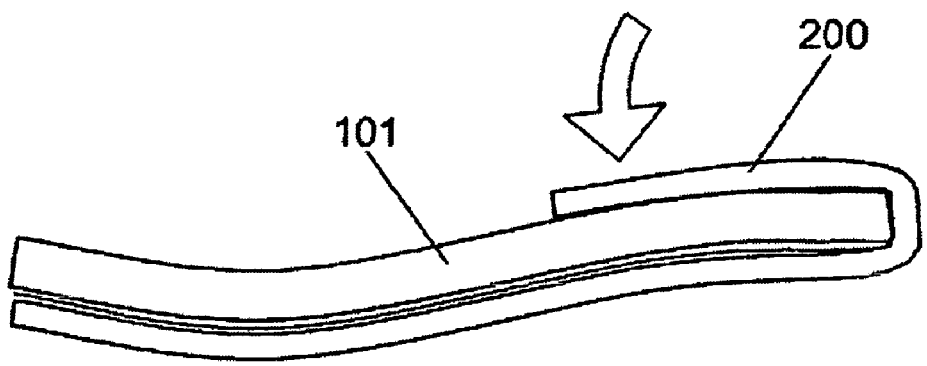

FIG. 4A shows how a stratified object (obtained in a press and comprising a support 100, an intermediate layer 180, and a lining 200 covering a visible surface of the support; the lining layer 200 is adhered to the support 100) on a cradle 410, where the stratified object is positioned in a predetermined manner by means of reference points, as is customary in this type of installations (FIGS. 4A–4Q only show one area of the headliner which is going to be edged, the cradle (formed by a mold copying the shape of the headliner in the area which is going to be edged) and counter-cradle are located in this area, then there can be a bar cradle where the rest of the headliner is supported; there can also be other areas, for example, an area opposite to the one shown in FIG. 4A, and in which an edging and, therefore, removal of a surplus portion of the support, must also be carried out). Said cradle 410 and a counter-cradle or hold-down plate 420 constitute holding means for holding the stratified object, as schematically shown in FIG. 4B. Once the counter-cradle or hold-down plate 420 has been lowered and rests on the stratified object, said object is immobilized between the cradle 410 and counter-cradle or hold-down plate 420, as is customary in this type of installations (obviously, both the cradle 410 and the hold-down plate 420 can, in practice, be constituted of a plurality of members, each one of which supports, presses against or holds a certain area of the stratified object; however, for greater simplicity, the cradle 410 and the hold-down plate 420 have been Illustrated as respective compact blocks in the figures). The correct position of the stratified object is assured with reference points.

Figure 5:
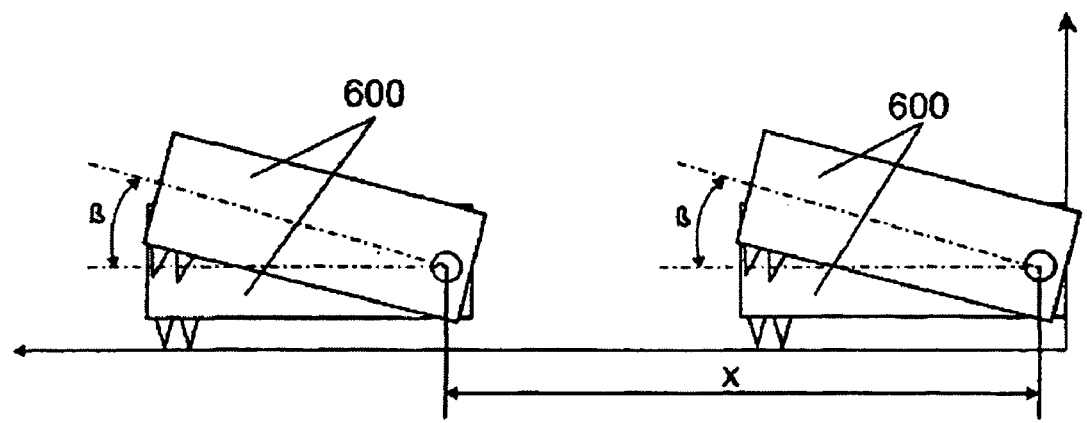
FIG. 5 schematically shows the separator member in different positions corresponding to a work cycle.

The machine also includes a separator member 600 schematically shown in FIG. 5: said member is able to shift between a first position and a second position, withdrawn with regard to the first position, by means of shifting a distance x in a horizontal direction. Furthermore, the separator member can be swiveled an angle β, such that it can go from being in contact with the support (which would correspond to its horizontal position in FIG. 5) to not being in contact with the support (adopting the tilted position in FIG. 5).

Figure 6:
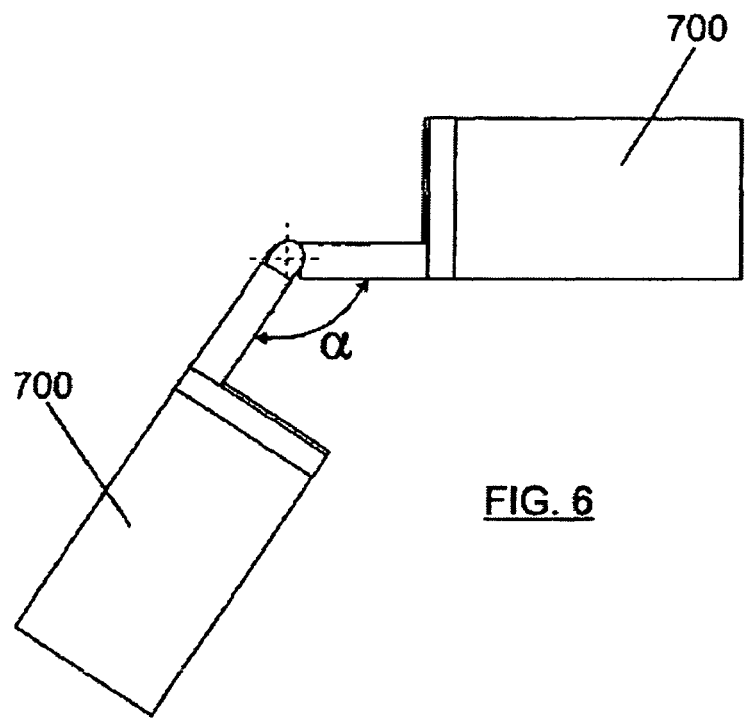
FIG. 6 schematically shows the support member in its support position and in its withdrawn position.

On the other hand, the machine includes a support member 700 (schematically shown in FIG. 6) which can swivel an angle α between a support position (the horizontal position in FIG. 6), in which it is in contact with the lining layer of the stratified object, and a withdrawn position, in which it is not in contact with the lining layer of the stratified object.

FIG. 4C shows the machine in a phase in which the stratified object is held between the cradle 410 and the counter-cradle or hold-down plate 420. The support member 700 is in its support position, supporting at the lower portion the "free end" or projecting end of the stratified object. At the same time, the separator member 600 is in its second position (the relatively withdrawn position) and still lifted, i.e., without being in contact with the stratified object. Now, the entire assembly of members shown in FIG. 4C can be shifted (horizontally for example), such that it enters a soundproof chamber (not shown) (to protect the operators from the noises caused by the high frequency ultrasounds) in which the cutting system is located and in which the cutting of the support and the application of steam are carried out according to the steps which will be described below (obviously, it would also be possible to implement the installation without this shifting of the members, for example, if the cutting process is not very noisy, such that it is not necessary to perform this process in a soundproof chamber, or by lowering soundproof walls protecting the operators from the cutting process noise).

In FIG. 4D, and now inside the soundproof chamber, the separator member 600 has been swiveled downward and is resting on the support 100 of the stratified object. There is an open space 610 between the hold-down plate 420 and the separator member 600 through which an ultrasonic cutting tool 500 can enter, which tool will cut the support according to a predefined cutting trajectory (for example, by means of the configuration of the corresponding cutting robot; the trajectory can follow the lower edge of the hold-down plate 420, which presses against the support 100 to prevent unwanted movements from occurring in this area and to thus achieve better cutting accuracy). The ultrasonic cutting tool can be shifted by a programmed robot arm, which is customary in this type of machines.

On the other hand, the support member 700 has a channel 710 following the cutting trajectory. In FIG. 4E, it can be observed how the cutting tool 500 has made a cut going through the support 100, such that a surplus portion 102 has been separated from the main portion 101 of the support; the intermediate layer 180 has also been traversed. However, the cut has not gone through the lining layer 200 which, due to the pressure exerted by the cutting tool 500, has been pressed downward in the cutting area, entering in the channel 710 due to the elastic deformation of the lining layer. The channel 710 thus contributes to preventing the cut from going through the lining layer 200 or from substantially damaging it, which is important since the intention is to prevent leaving marks on the visible surface of said layer.

On the other hand, in FIG. 4E it can be observed how a hot fluid expulsion member 450, in this case a convector 450 applying steam 451, is pivotally arranged about a shaft 452; the convector receives steam from a standard steam generator (not shown). In the position shown in FIG. 4E, the convector 450 is in a withdrawn position with regard to the stratified object and aimed downwards; it expels steam during the cutting operation to pre-heat or keep the walls of the convector hot.

Once the cutting has been carried out, the cutting tool 500 is withdrawn (FIG. 4F), and the lining layer 200 practically recovers its original shape in the cutting area, coming out of the channel 710.

Then (FIG. 4G) the support member 700 swivels an angle α towards its withdrawn position, allowing the steam convector 450 to be able to move up towards the steam application area. At the same time, the separator member 600 is lifted, swiveling the angle β, such that it is no longer in contact with the support in order to then advance (in the direction towards the left in FIG. 4G) towards that which is its "first position". The convector 450, while at the same time moving up towards the steam application area (during this movement it may be preferable for it to not expel steam, i.e., may be preferable for the convector to expel steam only before moving downwards—to heat its walls—and once it is correctly positioned to apply the steam on the lining), rotates (FIG. 4H) about the shaft 452, swiveling towards a position in which its steam expulsion opening is aimed upwards, close to the area of the lining layer 200 corresponding to the surplus portion 102 of the support, as can be seen in FIG. 4I, where it can be seen how the convector 450 expels steam 451 on the lining layer 200 in said area, to weaken the adhesion between the lining layer and the surplus portion 102 of the support.

Once steam has been applied during a pre-programmed time, the convector 450 again occupies its initial position (far from the steam application area and aimed downwards), the support member 700 again rotates an angle α to occupy its support position (FIG. 4J), and the separator member 600 moves downward again, swiveling angle β in order to come into contact (FIG. 4K) with the surplus portion 102 of the support, in its first position. The separator member can be provided with claws 605 to improve the grip on the surplus portion 102 of the support (for example, the claws can be introduced in the groove made by the cutting in the support such that as the separator member moves backwards, it drags—due to the action of the claws—the support and the lining is not damaged). The separator member begins to move backwards (FIG. 4K) from the first position towards its second position, dragging the surplus portion 102 of the support (and, in this case, the intermediate layer 180), until it reaches its second position (FIG. 4L), in which the surplus portion 102 of the support has been completely detached from the lining layer 200 (although a slight adherence may remain).

Once this operation of breaking the adherence between the surplus portion of the support (or while said operation is being carried out, to maximally optimize cycle time) has concluded, the cradle 410, counter-cradle or hold-down plate 420, separator member 600, support member 700 and the stratified object can exit (by means of a horizontal shifting of these members) the soundproof chamber and return to the initial position, where the stratified object was placed on the cradle. The hold-down plate can be lifted and the stratified object exposed (FIG. 4M), and an operator can then remove the surplus portion 102 from the support (FIG. 4N), apply adhesive on the portion of the lining layer 200 projecting with regard to the trimmed edge 101a, and folding said portion of the lining layer 200 over the trimmed edge 101a, such that said trimmed edge is covered by the lining layer 200 (FIGS. 4O–4Q).

The materials, size, shape and arrangement of the members will be susceptible to variation, provided that this implies no alteration of the basic concept of the invention.

Throughout the present description and claims, the word "comprise" and variations thereof, such as "comprising", do not intend to exclude other steps or components.

The invention claimed is:

1. A process for manufacturing a headliner for an interior of an automobile, the headliner including a support having at least one layer, and a lining covering a visible surface of the support, and at least one edge of the support; the process comprising the following consecutive steps:
   a) introducing, in a press, at least one layer for constituting a support, and at least one lining layer for the visible surface of the headliner;
   b) applying pressure and heat on the layers to obtain an assembly of layers joined to one another and having a predetermined shape;
   c) cutting the support such that at least one surplus portion of the support, not intended to be part of the stratified product, is separated from a main portion of the support, intended to be part of the stratified product, said at least one surplus portion of the support being joined to the main portion of the support by the lining layer after the cutting step;
   d) applying a hot fluid on the lining layer in an area corresponding to said at least one surplus portion of the support;
   e) separating said at least one surplus portion of the support from the lining layer, such that an assembly having the main portion of the support and the lining layer is maintained, a portion of the lining layer projecting with regard to the main portion of the support, in correspondence with at least one trimmed edge of the main portion of the support; and
   f) covering said at least one trimmed edge with the lining layer.

2. A process according to claim 1, wherein the hot fluid is steam.

3. A process according to claim 1, wherein in step a), the lining layer is located on an intermediate layer selected to facilitate the separation of the portion of the lining layer from the support.

4. A process according to claim 3, wherein said intermediate layer is a thermoplastic film.

* * * * *